May 6, 1924.
S. W. NICHOLSON
1,492,576
VEHICLE WINDOW CONTROL MECHANISM
Filed July 10, 1920    4 Sheets-Sheet 1
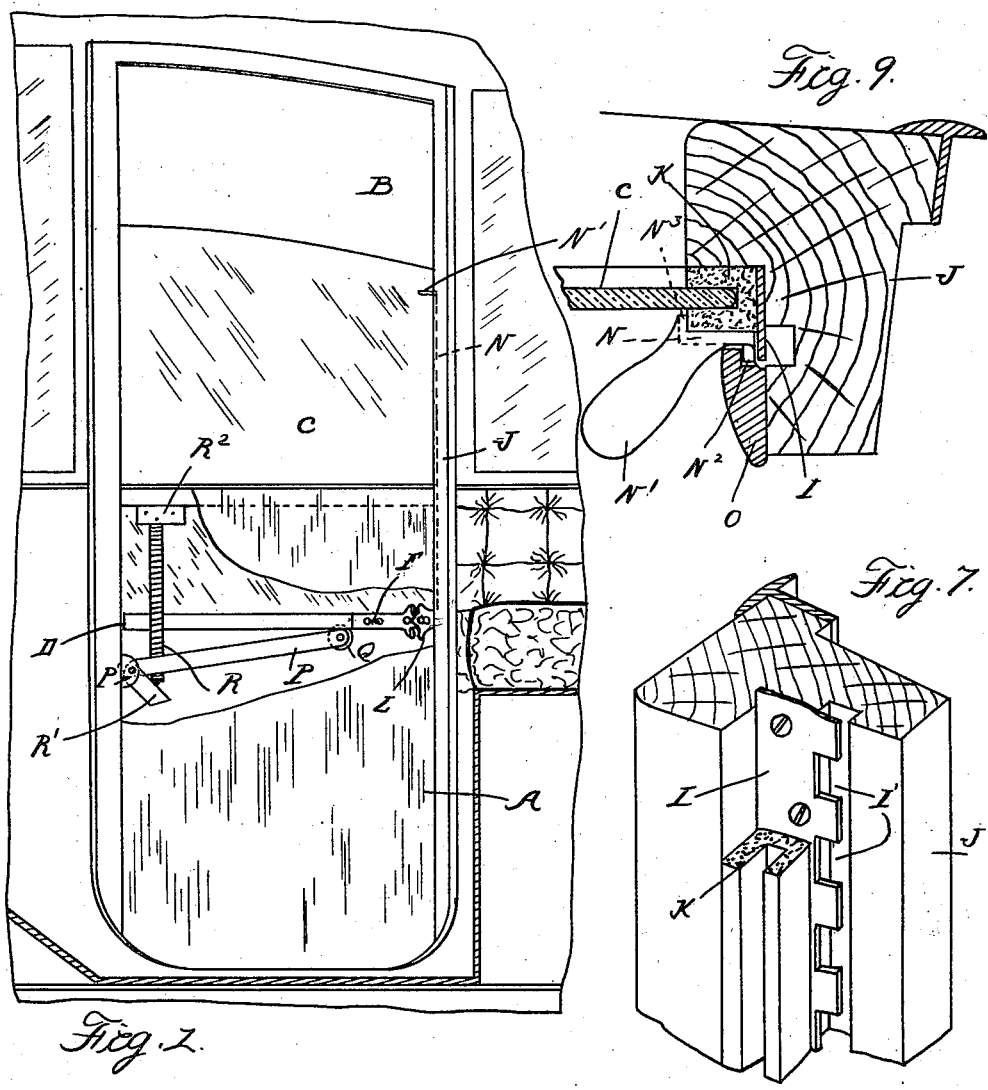
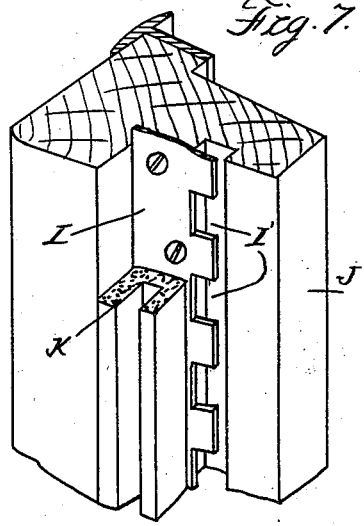
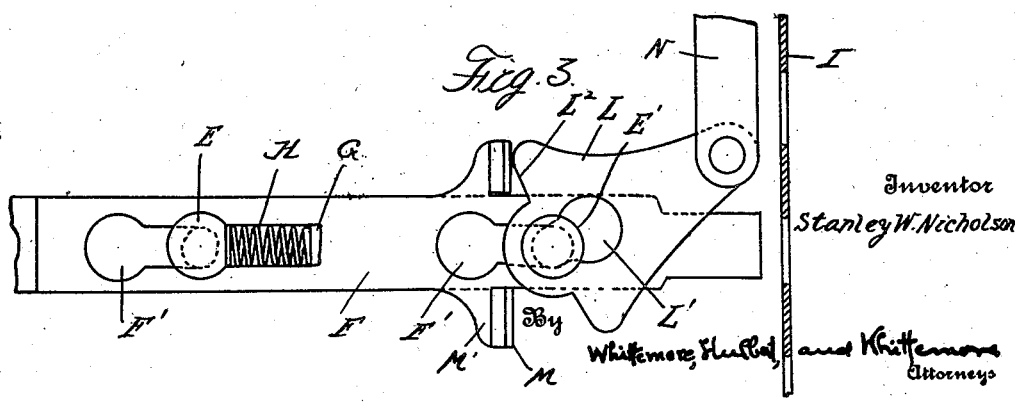

May 6, 1924.
S. W. NICHOLSON
1,492,576
VEHICLE WINDOW CONTROL MECHANISM
Filed July 10, 1920      4 Sheets-Sheet 2
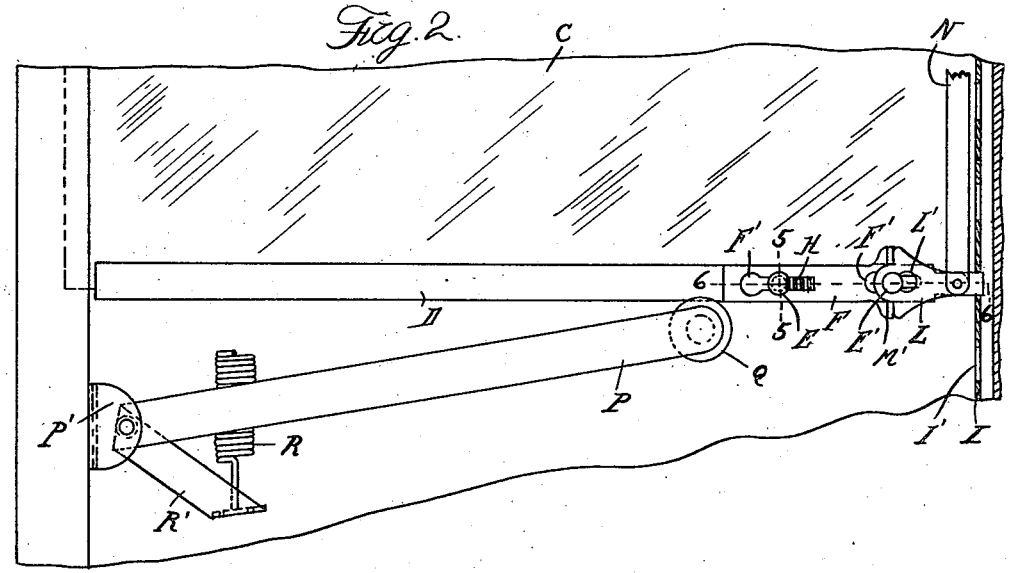
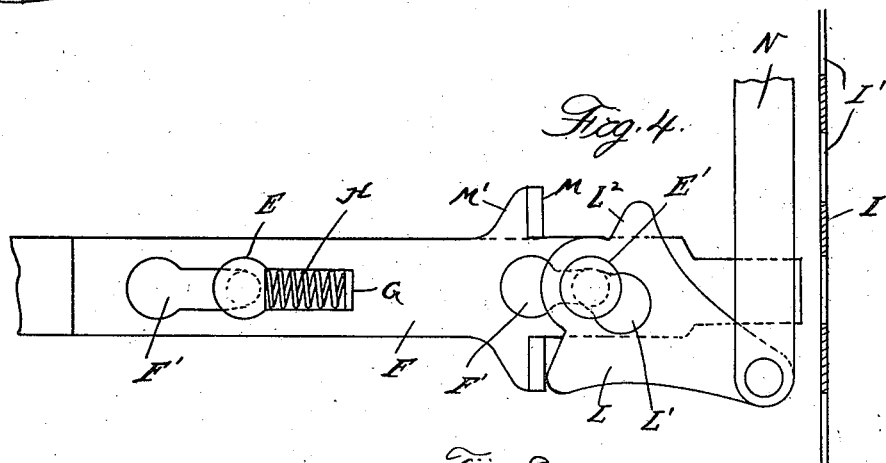
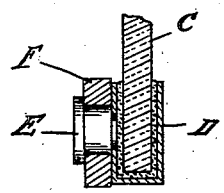
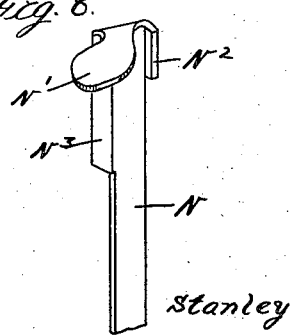
Inventor
Stanley W. Nicholson
By Whittemore, Hulbert and Whittemore
Attorneys May 6, 1924.
S. W. NICHOLSON
VEHICLE WINDOW CONTROL MECHANISM
Filed July 10, 1920
1,492,576
4 Sheets-Sheet 3
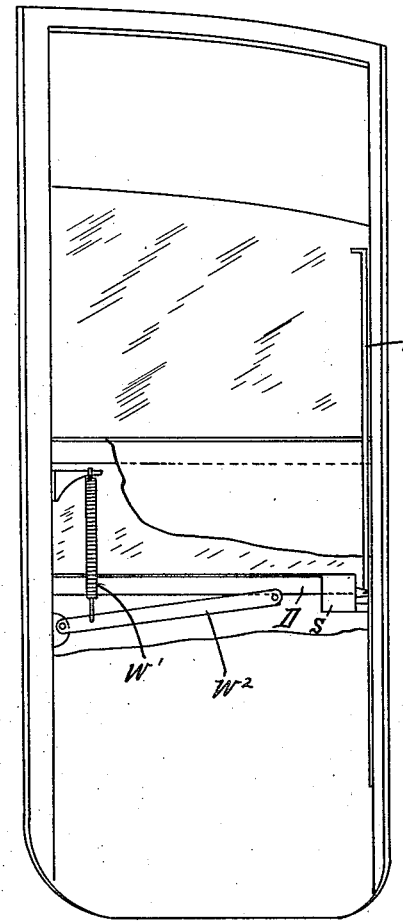
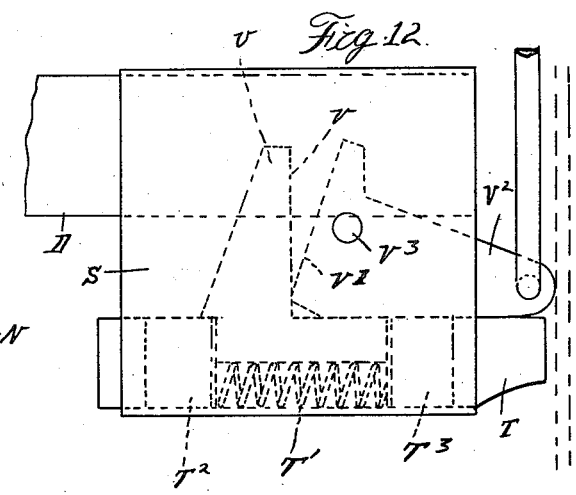
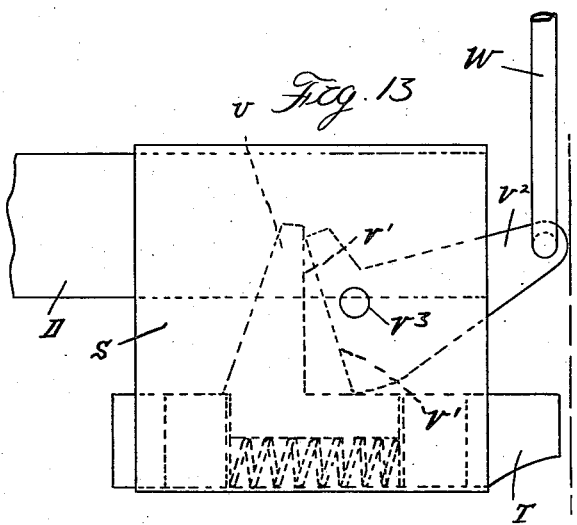
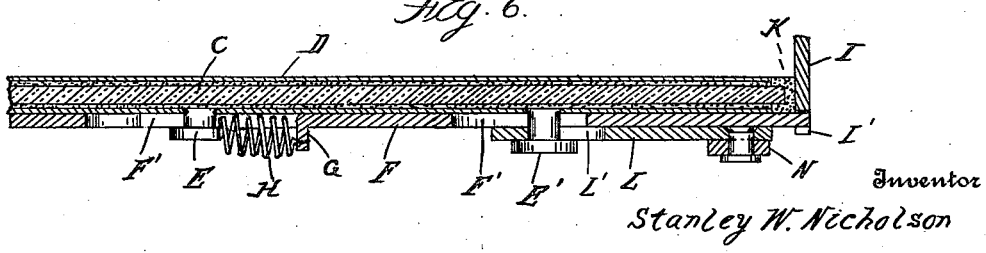
Inventor
Stanley W. Nicholson
By Whittemore, Hulbert and Whittemore
Attorneys

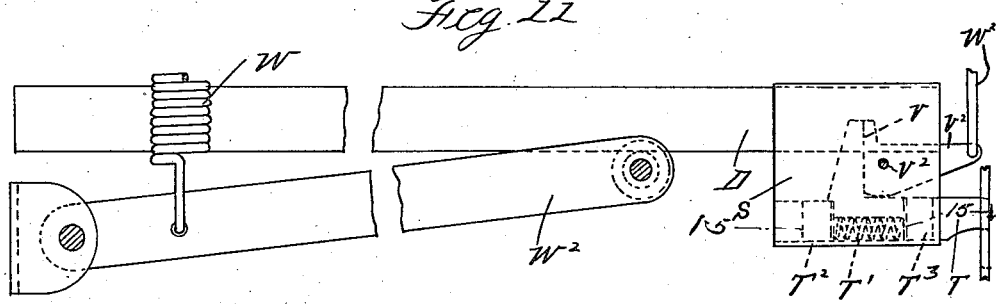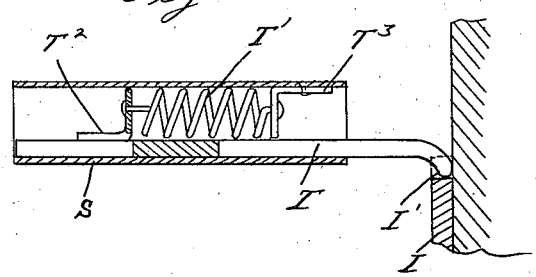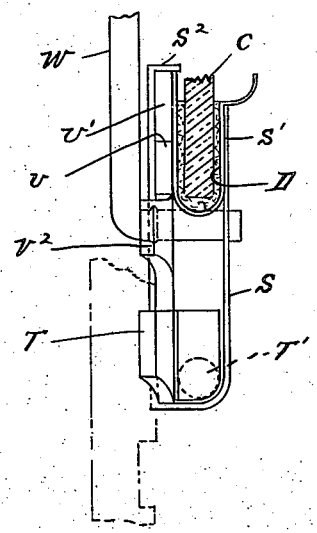

Patented May 6, 1924.

1,492,576

UNITED STATES PATENT OFFICE.

STANLEY W. NICHOLSON, OF TOLEDO, OHIO, ASSIGNOR TO THE DURA COMPANY, OF TOLEDO, OHIO, A CORPORATION OF DELAWARE.

VEHICLE WINDOW-CONTROL MECHANISM.

Application filed July 10, 1920. Serial No. 395,313.

*To all whom it may concern:*

Be it known that I, STANLEY W. NICHOLSON, a citizen of the United States of America, residing at Toledo, in the county of Lucas and State of Ohio, have invented certain new and useful Improvements in Vehicle Window-Control Mechanism, of which the following is a specification, reference being had therein to the accompanying drawings.

This invention relates to vehicle window control mechanism and more particularly to control mechanism for automobile windows.

It is the object of the invention to provide an efficient and simple manually operable mechanism for effecting raising or lowering the glass in a window of the sliding glass type, and to provide at the same time for retaining the glass in different positions of adjustment.

The invention consists in certain arrangements and combinations of parts as will more fully hereinafter appear.

In the accompanying drawing:

Figure 1 is an interior view of a motor vehicle door to the window of which the invention is applied;

Figure 2 is an enlarged view of the actuating mechanism as seen in Figure 1, showing the latched position of the latch mechanism.

Figure 3 is a fragmentary view of the locking elements of the mechanism showing how unlocking is effected during upward actuation of the window;

Figure 4 is a similar view showing how unlocking of the parts is effected during downward actuation of the window;

Figure 5 is a vertical sectional view taken on line 5—5 of Figure 2, and primarily showing the latch mechanism;

Figure 6 is a horizontal sectional view taken on line 6—6 of Figure 2, and also showing the latch mechanism.

Figure 7 is a perspective detail view showing the mounting of a notched locking plate upon the door frame;

Figure 8 is a perspective detail of the upper end portion of the control rod for the latch mechanism;

Figure 9 is a sectional view taken upon line 9—9 of Figure 1 and showing the engagement of the control rod with the door frame;

Figure 10 is a view similar to Figure 1, but showing a modified construction;

Figure 11 is a view showing the latched position of the modified latch mechanism;

Figure 12 is a view showing the unlatched position assumed by said mechanism upon downward actuation of the control rod;

Figure 13 is a similar view showing how un-latching is effected upon upward actuation of the control rod;

Figure 14 is a vertical section taken upon line 14—14 of Figure 11;

Figure 15 is a horizontal sectional view of the same taken on line 15—15 of Figure 11.

In these views the reference character A designates an automobile door, the lower portion of which is of the usual hollow or chambered construction, while the upper portion is provided with a window opening B and with a vertically slidable plate of glass C as a closure for said opening. The lower edge of said plate is embraced by a sheet metal channel member D, secured to the glass in any desired manner. To one end portion of said channel member there are secured two spaced headed pins E and E', which jointly provide a mounting for a sliding latch bolt F, having the key hole slots F' for respective engagement with said pins, the relatively narrow portions of said slots normally engaging the pins, while the enlarged end portions of the slots are proportioned to accommodate the heads of the pins and permit a ready assembly. Between the pin E and a tongue G, laterally deflected from the bolt F, there is engaged a spring H which urges the bolt F into normal engagement with a locking plate I formed from an elongated strip of sheet metal and secured to one of the side pieces J of the door, one edge of said plate being formed with a succession of notches I', adapted for selective engagement by the latch bolt. As is clearly shown, in Figure 7 and 9, the locking plate I is located behind the channeled strip of felt K, which forms a slideway for an edge of the glass plate C. In addition to functioning as a support for the latch bolt, the pin E' provides a pivotal mounting for a cam member L, having the key hole slot L' to facilitate its engagement with said pin. Said cam member has shoulders L² above and below its pivot, which through rocking of said member are adapted to alternatively engage tongues M struck out from upward and downward opposed extensions M' on the latch bolt, and the latter is thus adapted to be shifted to its unlocked position disclosed in Figures 3 and 4 respectively. Since in all of its positions of adjustment, the cam member L is engaged by one or both of the tongues M under pressure of the spring H, the enlarged portion of the key hole slot L' is restrained against such registration with the head of the pin E', as might permit accidental disengagement of the cam member from said pin. To said cam member there is pivotally secured the lower extremity of an actuating rod N which extends upwardly adjacent the side piece J of the door and terminates adjacent the upper extremity of the window member C, the upper end of said control rod being bent over as indicated at N' to form an operating handle. Adjacent to said handle, the rod is formed with a guide lip $N^2$, which engages beneath the trim stick O and with a guide lip $N^3$, bent oppositely to the lip $N^2$ and engaging the felt slide way K. Thus, the upper end portion of the control rod is accurately guided in its sliding movement and is held in close proximity to the side piece J of the door.

Considering the operation of the mechanism as so far described, normally the thrust of the spring H upon the latch bolt F acts both to project said bolt into engagement with the locking plate I and to maintain the cam member L in the substantially horizontal position indicated in Figure 2, this position resulting from the counterbalancing pressures exerted by the tongues M of the bolt upon the shoulders $L^2$ of the cam. Upon upward actuation of the rod N, the cam member L is rocked upwardly as shown in Figure 3 so as to deflect the latch bolt out of engagement with locking plate I due to the pressure of the upper shoulder $L^2$ upon the corresponding tongue M. When the bolt reaches the limit of its retraction established by engagement of the restricted ends of the slots F' with the pins E and E', an upward movement of the glass plate C results from a continued pull upon the rod N. Similarly when a downward pressure is exerted upon the rod N, the cam member L is first rocked to the position shown in Figure 4, retracting the latch bolt through engagement of the lower shoulder $L^2$ with the corresponding tongue M. Upon completion of the retracting movement, the continued downward pressure exerted upon rod N, subjects the glass plate C to a downward travel. The notches I' in the locking plate I are sufficiently numerous to permit the plate C to be locked in practically any desired position of adjustment, through engagement of the latch bolt with one of said notches when the operating rod is released.

In order to minimize the effort required to accomplish an adjustment of the window member C in either direction, it is desirable to counterbalance the same. Preferably this result is effected by means of an arm P pivoted at one end upon a bracket P' secured to the opposite side piece J' from that to which the locking plate I is secured.

Upon its free end, said arm carries a roller Q which engages beneath the channel member D and a coiled spring R acts upwardly upon the inner portion of said arm with a force substantially counterbalancing the weight of the member C. Preferably said spring has the nature of a coil, which is secured at its lower end to an arm R', bent downwardly from the pivotal extremity of arm P at an acute angle thereto, the upper end of said spring being anchored to a bracket $R^2$ mounted at the top of the chambered portion of the door.

In the modified form of the invention illustrated in Figures 10 to 15 inclusive, S is a sheet metal casing substantially of U-shape, which casing depends from the channel member D at one end thereof and has one of its sides soldered, or otherwise rigidly secured to a corresponding side of said channel member, as indicated at S', the other side of said casing being spaced outwardly from the corresponding side of said channel and being flanged inwardly at its upper edge as indicated at $S^2$ to engage above the corresponding edge of the channel. Soldering, brazing or welding may be employed, if desired, to rigidly attach the flange $S^2$ to the channel member. The depending portion of the casing S carries a horizontally sliding latch member T, which may be formed of heavy sheet metal, and in its projected position is adapted to engage in any of the notches I' of the locking plate I. Said latch member is normally projected by a tension spring T', which is located within the casing S, being attached at one extremity to an angular bracket $T^2$ secured to the rear portion of the latch member, while its other, or forward extremity is attached to a bracket $T^3$, rigidly secured to said casing S. Thus, shifting of the latch member T from its projected position shown in Figure 10, to either of its retracted positions shown in Figures 12 and 13 is resisted by said spring. Said latch member is maintained in its proper position of sliding engagement with one wall of the casing jointly by the brackets $T^2$ and $T^3$, and by an upward extension U of said latch member engaging in the narrow space U', between the channel member and the adjacent wall of the casing S. Said extension has a vertical forward edge V, which normally bears against a face V' of a cam member $V^2$ arranged to rock within the casing S upon the pivot $V^3$. Said cam member projects forwardly out of said casing and has attached thereto the lower end of a control rod W, which extends upwardly correspondingly to the rod N already described. In the modified construction, the counterbalancing spring W', directly engages the counterbalancing arm W². The modified construction is operated in precisely the same manner as the first described form of the invention.

It is a desirable feature possessed by either embodiment of the invention, that the latch mechanism is completely concealed within the chambered lower portion of the door, the mechanism thus concealed including the latch plate I, the only exposed element being the control rod, which extends sufficiently into the window opening to permit actuation of the window member to its lowermost position.

It is furthermore to be noted that in either described construction a single movement of the control rod in the direction in which the window is to be actuated serves to first unlock the window and to then accomplish the desired actuation.

What I claim as my invention is:

1. In a window control mechanism, the combination with a vertically slidable window member of a vertical latch bar secured to the window frame, a channel member engaging the bottom of the slidable member, a substantially U-shaped casing having one side thereof secured to a corresponding side of said channel member and the other side spaced from the other side of the channel member, a latch bolt slidable in said casing transversely of said latch bar to engage or disengage the latter, said bolt having an extension into the space between said channel and the adjacent side of the casing, a cam member pivoted upon the casing, engageable with said extension to retract the bolt, and actuating means for said cam member.

2. In a window control mechanism, the combination with a member having a window opening and having a chamber below said opening, of a sliding window member closing said opening in its raised position and entering said chamber in its lowered position, latch mechanism carried by said window member arranged adjacent the lower portion thereof, and a control member for said latch mechanism carried by the window member and projecting upwardly in said window opening.

3. In a window control mechanism, the combination with a member formed with a window opening and having a chamber below said opening, of a vertically slidable closure for said window opening, adapted to enter said chamber when lowered, latch mechanism for said sliding closure completely disposed within said chamber, and a control rod for said mechanism forming an actuating member for the closure and extending adjacent the upper portion of the latter.

4. In a window control mechanism, the combination with a member provided with a window opening and having a chamber below said opening, of a vertically slidable closure for said opening adapted to enter said chamber when lowered, a latch member carried by the lower edge portion of said closure within said chamber, a latch plate disposed within said chamber and formed with a vertical series of notches for selective engagement by said latch member, and a control rod for said latch mechanism extending upwardly adjacent said closure and terminating near the upper portion of the closure.

5. In a window control mechanism, the combination with a sliding window member, of a latch mechanism therefor carried by and arranged upon the lower portion thereof, a control rod for said mechanism extending upwardly adjacent a side piece of the door, and means engaging the upper portion of said control rod with said side piece to guide said rod.

6. In a window control mechanism, the combination with a vertically sliding window member and a frame in which said member slides, of a latch mechanism carried by said member at its lower portion, a control rod for said mechanism extending upwardly adjacent said member, a trim stick upon said frame, a channel member providing a guideway for the sliding member, and guiding means carried by said control rod and engaging said trim stick and channelled member.

7. In a window control mechanism, the combination with a vertically slidable window member and a frame in which said member is mounted, of a channelled guide member for said window member carried by said frame, a trim stick mounted upon said frame adjacent said channeled member, a locking mechanism arranged upon the lower portion of said window member, and a control rod for said locking mechanism upwardly extending between said trim stick and channeled member.

8. In a window control mechanism, the combination with a vertically slidable window member and a frame in which said member is mounted of a slideway for said window member carried by said frame, a latch member carried by the window member, and a locking plate mounted upon said frame behind said slideway, and having a notched portion extending laterally beyond the slide-way for engagement by said latch member.

9. In a window control mechanism, the combination with a member having a window opening and formed with a chamber adjacent said opening, of a sliding window member normally closing said opening and entering said chamber in its opened position, latch mechanism for said window member mounted at the edge thereof normally adjacent said chamber, and a control member for said latch mechanism carried by the window member and projecting into said window opening in all positions of the window member.

10. In a window control mechanism, the combination with a vertically slidable window member, and a chamber below the window opening, receiving said member in the opened position thereof, of a latch mechanism carried by the window member for retaining the same in different positions of adjustment, a control member extending from said latch mechanism to the upper portion of the window member and accessible in all positions of said member, said latch mechanism being releasable by either an upward or downward pull on the control member.

11. In a window control mechanism, the combination with a vertically slidable window member and a chamber beneath said member receiving the latter in the lowered position thereof, of a latch mechanism carried by the window member within said chamber, and a control member for said latch mechanism upwardly extended to be accessible in all positions of adjustment of the window member.

12. In a window control mechanism, the combination with a vertically slidable window member, and a chamber below the window opening receiving said member in the open position thereof, of two co-acting latch elements within said chamber, one of said elements being stationary and the other mounted upon said window member, and means carried by the window member and accessible within the window opening for subjecting the window member to either an upward or downward actuating force, said means acting upon the latch element carried by the window member to release the same upon initial application of the actuating force.

13. In a window control mechanism, the combination with a vertically slidable window member, of a vertically elongated stationary latch member, a coacting latch member, and a support for said coacting member projecting downwardly from the sliding window member adjacent a side edge thereof.

14. In a window control mechanism, the combination with a vertically slidable window member, of a vertically elongated stationary latch member, a casing extended downwardly from the sliding window member in the plane of said member adjacent a side thereof, and a latch member within said casing coacting with said stationary latch member.

15. In a window control mechanism, the combination with a slidable window member, and a chamber receiving said member in the opened position thereof, of two coacting latch elements within said chamber, one of said elements being stationary and the other mounted upon said window member, and means carried by the window member and accessible within the window opening for actuating the window member either to or from its closed position, said means acting upon the latch element carried by the window member upon initial application of the actuating force in either direction to release said latch element.

16. In a window control mechanism, the combination with a member having a window opening and formed with a chamber adjacent said opening, of a sliding window member normally closing said opening and entering said chamber in its open position, coacting latch elements respectively carried by said window member and stationary within said chamber, and a control element for the latch element upon the window member elongated upon the window member adjacent an edge thereof parallel to the direction of travel of said member.

17. In a window control mechanism, a member having a window opening, a vertically slidable window member forming a closure for said opening, a latch member arranged below the window opening and elongated to extend adjacent the vertical edge of the window member when the same is lowered, a control rod carried by said closure, and a latch element upon the closure adjacent its lower edge actuable by said rod and coacting with the elongated latch member to hold the window member adjusted.

18. In a window control mechanism, a slidable window member, a chamber receiving said member in open position thereof, a latch member located substantially in its entirety within said chamber, a coacting latch element carried by the window member, and a common means carried by the window member for actuating sliding of said member in either direction and for controlling the latch element upon said window member.

In testimony whereof I affix my signature.

STANLEY W. NICHOLSON.